Patented July 12, 1949

2,476,000

UNITED STATES PATENT OFFICE 2,476,000

HYDROCARBON POLYMERS

William J. Sparks, Cranford, N. J., and Robert M. Thomas, Baton Rouge, La., assignors to Standard Oil Development Company, a corporation of Delaware No Drawing. Application August 10, 1945, Serial No. 610,212

7 Claims. (Cl. 260—85.3)

This application relates to polymeric material; relates particularly to the copolymerization of polyolefins such as diolefins with olefinic modifiers; and relates especially to a new process for copolymerizing at low temperatures diolefins or predominantly diolefinic material with auxiliary mono-olefinic polymerizable substances to modify the character of the polymer; and to the products therefrom.

The polymerization of olefinic materials has been conducted in many different ways, to yield many different products, but up to the present time it has not been found possible to produce a clear, light colored transparent, tough, diolefinic polymer suitable for use as a lacquer, or enamel, or other surface coating. The diolefins, both as such and in admixture with minor proportions of other mono-olefinic substances, have been polymerized by an emulsion technique into rubber-like polymers; and certain of the tertiary-base mono-olefins, such as isobutylene, and isobutylene with less than about 10% to 30% of a diolefin have been polymerized at very low temperatures into other forms of rubbery polymers of high elongation and tensile strength. Also, in the prior art, dark, brittle polymers have been made by the addition of Friedel-Crafts type catalysts to diolefinic materials at ordinary or elevated temperatures. To the present, however, it has not been possible to obtain clear, soluble, thermoplastic, sulfurizable, oxidizable, predominantly diolefinic polymers by a low temperature polymerization technique.

The present invention provides a process in which olefinic materials which are predominantly diolefinic are dissolved in a low freezing solvent which is also a good solvent for the resulting polymer, the mixture is cooled to temperatures, below $-10°$ C., and polymerized by the application to the cooled solution of a Friedel-Crafts type catalyst dissolved in a low freezing, inert solvent. This procedure yields a polymer which is tough, but has only a moderate elongation; lacks the high elongation which is characteristic of the rubbery type of polymers and lacks the brittleness of most of the ordinary thermoplastic or thermosetting resins. The predominantly diolefinic copolymer of the invention is soluble in hydrocarbon solvents; from which it is deposited, upon evaporation of the solvent, as a clear, tough, flexible, water-white film which oxidizes in air like a drying oil, into a highly satisfactory lacquer, or paint, or enamel base. Also, the resulting copolymer is thermoplastic and reactive with both sulfur and oxygen. These properties make it useful as a molding composition, especially in the presence of sulfur or oxidizing compounds which convert it into hard bodies having some of the characteristics of hard rubber; and also under conditions suitable for oxidation where it is highly useful as a base for a lacquer or paint film.

The raw materials for the present invention are the multi olefins, particularly butadiene and the substituted butadienes both conjugated and non-conjugated as well as the trienes and higher unsaturates. The preferred multi olefin is butadiene, but any of the multi olefins having from 4 to about 15 carbon atoms per molecule are usable and more or less advantageous for the present invention. That is, while butadiene is the preferred material, dimethylbutadiene is almost as good, especially the 2,3-dimethyl butadiene-1,3. Other usable multi olefins are isoprene, piperylene, the various ethyl butadienes, particularly the 1,4-diethyl butadiene-1,3; the propyl butadienes, particularly the 1,4-propyl butadiene-1,3 and also the triolefins such as myrcene and allo-ocimene. It is not necessary that the olefins be conjugated since the non-conjugated olefinic compounds are similarly usable. These include such compounds as dimethallyl, divinylbenzene, and the like.

It may be noted that there is a distinct difference in the character of the polymer obtained from the different multi olefins, some being superior for one purpose, some for another but all of the multi olefins tested so far have been found to be satisfactory for one purpose or another and it is believed that all of the multi olefins having from 4 to 15 inclusive carbon atoms are efficient and usable for one purpose or another.

For the secondary raw material, any of the mono olefins having from 3 to 20 carbon atoms per molecule are useful. Particularly useful is the iso-octene, known as "dimer," particularly as produced by the doubling up of two molecules of isobutylene. Equally useful are the iso-heptene and iso-hexene compounds. Other compounds which are useful and satisfactory for the polymerization are such compounds as propylene, the butenes both normal and iso, and the like. For most purposes the iso-compounds are somewhat more satisfactory since they copolymerize somewhat more readily, but where a polymer of high diolefin content and relatively low molecular weight, with good uniformity of molecular weight, is desired, it is convenient to polymerize at a relatively low temperature in the presence of one of the more poisonous copolymerizates such as the normal butenes or propylene; whereas if a relatively high molecular weight and relatively high content of mono-olefin is desired to produce a compound of moderate iodine number, the less poisonous, more easily polymerizable substances such as isobutylene or isopentene or isohexene may be used.

Thus, an object of the invention is to copolymerize diolefinic materials such as butadiene, isoprene, pentadiene-1,3, dimethyl butadiene and similar poly-olefinic materials or mixtures of diolefinic materials, with small, modifying, quantities of copolymerizable auxiliary mono-olefinic materials at low temperatures; the polymerization mixture and the resulting copolymer containing a major proportion of the diolefin and a minor proportion only of the modifying substances to produce tough, elastic, almost colorless copolymers which are soluble in hydrocarbons which are also reactive with sulfur to yield tough, hard, resins having some of the characteristics of hard rubber, or in film form are reactive with atmospheric oxygen to yield tough, hard, durable coating films, which are highly advantageous as paint or lacquer bases with pigments and other substances. Other objects and details of the invention will be apparent from the following description.

In practising the invention a mixture is prepared containing the desired multi olefin in a major proportion and the mono-olefin in a minor proportion. The reaction mixture may contain only the polymerization materials or it may contain the polymerizable materials in the presence of a diluent or diluent-refrigerant.

The polymerization mixture is desirably cooled to a temperature ranging from $+10°$ C. to $-164°$ C., the preferred range being from about $0°$ C. to about $-100°$ C. The cooling action may be obtained by the use of a refrigerating jacket upon the storage tank and reactor, or by the use of an internal refrigerant.

If the cooling is obtained by a refrigerating jacket, any of the standard low-boiling liquids may be used, including such substances as liquid carbon dioxide, liquid propane, liquid ethane, liquid ethylene or liquid methane, or liquid sulfur dioxide, or the fluorine substituted hydrocarbons, with the liquid under pressure or vacuum in the jacket, as desired, to give the desired temperature.

If a diluent or a diluent-refrigerant or internal refrigerant is used, it may consist of such substances as liquid ethylene or liquid ethane or on occasion even liquid methane, although the boiling temperature of liquid methane at $-164°$ C. is usually lower than desirable; or liquid propane or liquid butane or liquid ethyl chloride or methyl chloride or the like.

If a refrigerating jacket is used or an internal refrigerant, there may also be present a diluent in addition, which may be any of the saturated hydrocarbon liquids which boil above the temperature set by the refrigerant; or may be any of the mono or poly-halogen-substituted hydrocarbons which are liquid at the reaction temperature, including such substances as ethyl or methyl chloride, chloroform, ethylene dichloride, ethyl or methyl mono or di bromide, or the corresponding fluorides or iodides; any of the hydrocarbons up to about 5 carbon atoms per molecule with any desired number of substituted halogen atoms being useful as long as the boiling point is above the polymerization temperature. The diluent or diluent refrigerant may be used in the proportion of from 0.5 part to 5 parts per 1 part of mixed polymerizable material. The reaction mixture is cooled to a temperature between $0°$ and $-164°$ C., the choice of temperature being determined by the desired molecular weight and the ease of copolymerization of the mixture. For many purposes the temperature of $-78°$ C. as set by solid carbon dioxide either in a refrigerating jacket or as a direct addition as an internal refrigerant in the polymerization mixture is appropriate. For other reactions liquid ethane or liquid ethylene is preferable and where a soft to semi-liquid resin is desired, a temperature of $-40°$ as set by liquid propane or approximately $0°$ as set by liquid butane are advantageous. When the desired temperature is reached the cold solution is polymerized by the application of a Friedel-Crafts type catalyst such as aluminum chloride dissolved in a low freezing, inert solvent such as ethyl or methyl chloride or carbon disulfide.

The polymerization catalyst may be any of the Friedel-Crafts catalysts disclosed by N. O. Calloway in his article on "The Friedel-Crafts Synthesis" printed in the issue of "Chemical Reviews," published for the American Chemical Society at Baltimore in 1935, in vol. XVII, No. 3, the article beginning on page 327; the list being particularly well shown on page 375. Of the list given by Calloway, aluminum chloride or aluminum chlor bromo or titanium tetra chloride are preferred. Gaseous boron trifluoride is usable with a very limited number of the diolefins, but boron trifluoride in solution to a relatively high concentration in such substances as liquid ethane or liquid propane or liquid butane or liquid pentane is advantageously usable. Titanium tetra chloride is also advantageously usable. The other Friedel-Crafts catalysts are usable under various circumstances depending upon the substances to be polymerized and the degree of poisoning effect of the multi olefins.

The catalyst solvent may be any non-complex forming, low-freezing substance which will dissolve 0.1% of the Friedel-Crafts catalyst or more. Ethyl and methyl chloride and carbon disulfide are particularly satisfactory with aluminum chloride. Any of the mono or poly halogen-substituted organic compounds up to 4 or 5 carbon atoms per molecule which have freezing points below $0°$ C. are useful. With aluminum bromo chloride, or boron trifluoride or titanium tetrachloride, many of the low-freezing aliphatic hydrocarbons are useful. The essential requirements are that the catalyst solvent dissolve at least 0.1% of the Friedel-Crafts catalyst substance; that the solvent have a freezing point below $0°$ C., thereby being low-freezing, and that the catalyst solvent boil away from the catalyst substance at a merely nominal rise in boiling point, not over 1 or 2 degrees above the boiling point of the pure solvent thereby being non-complex forming. The catalyst solution preferably has a concentration of from 0.1% to about 4% or 5% of the Friedel-Crafts type catalyst, and is preferably added within the range of from 0.1 part to 0.5 part to the diolefin solution. The amount of solvent, if used, is preferably sufficient to retain all of the polymer in the solution at the conclusion of the polymerization reaction. The polymer is then precipitated by the addition of from 0.01 part to 1 part of an oxygenated liquid such as methyl, ethyl or isopropyl alcohol, or acetone, or dioxan, or alkaline solutions, or ammonia or the like, and the solid, precipitated, polymer is removed from the solvent.

If no diluent is used, the polymerization reaction is preferably carried to a partial yield only, leaving unpolymerized enough monomers to serve as vehicle or carrier fluid for the polymer to make it as easy as possible to empty the reactor. In either event, a solid polymer may be obtained if desired.

The solid polymer may then be dissolved in a hydrocarbon solvent such as $54°$ solvent naphtha to produce a highly desirable lacquer which, upon application to a surface, and volatilization of the naphtha, leaves a thin but tough, durable, water-white film of protective polymer. The polymer solution may be mixed with dyes, pigments, colorants and other substances to produce a colored paint or enamel, or may be used for many other purposes.

Alternatively, the copolymer of the invention may be compounded with sulfur, and, if desired, with substantially any of the inert pigments and fillers, both inorganic and organic, and then cured with heat in a sulfurization reaction to yield a product resembling hard rubber in many of its characteristics, but having a greater strength both in tension and compression, and a greatly reduced brittleness, as well as a low solubility in solvents generally.

Alternatively, the polymer material with or without a diluent may be discharged into any convenient receiving liquid which may be a solvent for the polymer or may be water or may be a catalyst-destroying liquid or other substances.

The polymers of the present invention are resins, not rubber-like substances, and they have all relatively very low elongations. In the form as prepared, they are plastic, with a considerable amount of cold flow but no substantial elongation of the type characteristic of crude rubber. After oxidation, they remain slightly leathery and with a small elongation, always under 100% and usually less than 25% at break.

The polymers of the present invention show iodine numbers ranging from about 30 to about 275, although the preferred range is from about 65 to 200. Similarly, the polymers show molecular weights ranging from 3000 or 4000 up to about 100,000—the molecular weight being determined in part by the potency of the catalyst; in part by the lowness of the polymerization temperature; in part by the effect of the copolymerizate as a poison on the catalyst—and by many other factors, including the purity of the copolymerizates, the amount and character of the diluent, and the like.

*Example 1*

One volume of a mixture of 80 parts of butadiene with 20 parts of styrene was dissolved into 200 parts of methyl chloride and the solution was cooled internally by the addition of an excess, approximately 100 parts of solid carbon dioxide. When the solution had reached a temperature of approximately $-78°$ C., a polymerization catalyst consisting of 0.5% solution of aluminum chloride in methyl chloride was added slowly to the rapidly stirred, cooled, butadiene-styrene solution to polymerize the olefins. After polymerization, the soluble polymer product was precipitated by the addition of isopropyl alcohol, and the ethyl chloride and alcohol were filtered from the solid, precipitated polymer. The solid polymer was dried to remove all traces of the alcohol, and the methyl chloride, and the dried polymer was redissolved in 54° naphtha. The resulting solution was a clear, water-white solution of a good viscosity. It was applied to a glass surface, and the naphtha allowed to evaporate. The polymer formed a clear, water-white coating which yielded a tough, transparent and a highly desirable lacquer.

The final hardening, setting and forming of the film appeared to involve an oxidation reaction of the polymer by atmospheric oxygen.

*Example 2*

One volume of a mixture of 85 parts of isoprene and 15 parts of isobutylene was dissolved in 200 parts of methyl chloride, and the solution was cooled internally with 100 parts of solid carbon dioxide. Polymerization was then brought about by the addition of 100 parts of a 1.2% solution of aluminum chloride in methyl chloride as a fine spray. The product was treated with isopropyl alcohol, filtered, evaporated, and found to be largely soluble in 54° naphtha. A clear, water-white film was obtained on subjecting the solution to drying and oxidizing conditions. The insoluble portions swell somewhat with the naphtha; and upon drying by volatilizing out the absorbed naphthas, the insoluble portions remain as hard, opaque, non-brittle solid particles.

The above examples show the production of a clear water-white lacquer or enamel which remains clear and water-white during the drying and becomes a tough, durable covering film. This lacquer, however, is readily modified by the addition of pigments such as lead carbonate, whiting, barytes, lithopone, chrome green, chrome yellow, rouge, the various clays and other coloring pigments which are customary in the making of paints, lacquers and enamels. Similarly, the various lakes may be used, and also the various oil soluble dyes.

*Example 3*

A mixture of 90 parts of butadiene with 10 parts of methyl styrene was prepared and cooled to a temperature of $-77°$ C. by the addition to the mixture of an excess of solid carbon dioxide. The mixture was copolymerized by the application thereto of approximately 20 parts of about a 1% solution of aluminum chloride in methyl chloride in the form of a fine spray applied to the surface of the rapidly stirred mixture. The mixture polymerized rapidly to a solid polymer. The solid polymer was then warmed to room temperature, dissolved in solvent and washed with water to remove the catalyst. The resulting solution was directly usable as a high grade paint, lacquer or enamel base, and was suitable for combination with pigments, colorants and fillers to yield high grade paint material. A portion of the polymer after warming to room temperature was worked on the roll mill, and approximately 3 parts of sulfur were incorporated therein, together with carbon black as an inert filler. The mixture was then placed in a mold and heated to a temperature of approximately 145° C. for a period of approximately 30 minutes. Upon cooling after this treatment, the material was found to be a non-brittle resin of somewhat reduced solubility in hydrocarbon solvents. Another portion of the polymerizate after warming to room temperature was compounded on the mill with approximately 25 parts of sulfur. Placed in the mold and heated as before, it yielded a hard, tough, non-brittle resin polymer of relatively low elongation and of very low solubility in solvents generally.

*Example 4*

A mixture was prepared consisting of 60 parts of butadiene with 40 parts of the octene obtained by coupling two molecules of isobutylene, commonly known as "dimer," or "diisobutylene." This mixture thus consisted of a major proportion of the diolefins and a minor proportion of the mono-isoolefins. The material was cooled to a temperature of approximately −10° C. by the application thereto of a refrigerating jacket containing a refrigerant under suitable pressure to provide a jacket temperature of about −10° to −12° C. to provide for the thermal gradient through the reactor walls.

To the mixture there was then added approximately 50 volumes, per 100 volumes of mixed olefinic material, of a catalyst solution of aluminum chloride in ethyl chloride in approximately a 4% concentration. Care was used to deliver the catalyst into the body of the rapidly-stirred olefinic material to avoid danger of polymerization of butadiene vapor alone above the surface of the liquid. The reaction began promptly and continued rapidly to the polymerization with this amount of catalyst of approximately 60% of the olefinic materials in the reaction mixture. At this point in the reaction, the material was discharged into a tank of warm water to destroy the residual traces of catalyst and vaporize out the unreacted olefinic material. The resulting polymer was found to be readily soluble in a wide range of organic solvents including the petroleum hydrocarbons, benzene, toluene, xylene, the various halogenated hydrocarbon compounds and a wide range of similar substances. It was found to be insoluble in "spirits" as exemplified by ethyl, methyl and propyl alcohol, ether, acetone and the like. From the solution it flowed readily upon a wide variety of surfaces and yielded an excellent, clear, transparent "tough" film.

The material was found to have an iodine number of approximately 150 and a molecular weight of approximately 15,000; the physical properties of the material being those of a very thick fluid or semi-solid, the characteristics in this respect being analogous to an asphalt, although the material was somewhat more "sticky" and slightly less solid. It is reactive with oxygen and upon standing in the form of a film, dried by oxidizing into a hard solid, non-fluid coating.

Example 5

A mixture was prepared consisting of approximately 65 parts of dimethyl butadiene and 35 parts of 2-methyl butene-1, (iso-pentene). This material likewise was cooled to a temperature of approximately −10° C. and treated as in Example 4 with a catalyst solution consisting of approximately 4 parts of titanium tetrachloride in solution in 50 parts of 54° naphtha. In this instance also the reaction began promptly and proceeded rapidly to the polymerization of approximately ⅔ of the olefinic material. The reaction mixture was discharged into warm 54° naphtha containing a small amount of alcohol, specifically, isopropyl alcohol. The polymer was found to be readily soluble in the naphtha and the unpolymerized dimethyl butadiene and isopentene were largely volatilized out from the solution. This material was treated with a cobalt naphthenate drier, in the proportion of approximately 0.2% and the solution spread upon a panel. It flowed readily under the brush and the naphtha evaporated promptly to leave behind a soft film which, in the presence of the cobalt naphthenate, dried down by oxidation to a hard, tough, water-white film of excellent durability in a relatively very short time of 2 or 3 days.

Example 6

A mixture was prepared consisting of 125 parts by weight of trimethyl ethylene and 175 parts by weight of butadiene. This mixture was cooled in a reactor to a temperature of approximately −30° C. and stirred vigorously. To the cooled mixture there was then added, dropwise, through a tube extending below the surface of the mixture, approximately 450 parts by weight of a solution of aluminum chloride in methyl chloride having a concentration of 0.80 gram of aluminum chloride per 100 cc's. of solution. The addition of catalyst solution was continued until approximately 65% of the original olefinic material had been copolymerized. The mixture remained fluid, the polymer remaining in solution in the unpolymerized material and the catalyst solvent. The liquid mixture was then poured into warm water which served to vaporize out the methyl chloride, the unpolymerized butadiene and the unpolymerized trimethyl ethylene. The solid polymer was then strained out from the water and dried on the open-roll mill after washing with a stream of running water. The dry product was a clear, colorless resin having an iodine number of 130, a molecular weight number of approximately 20,000 and a melting point of approximately 145.

This material was dissolved in solvent naphtha and the solution flowed in a film on a series of metal panels. These panels were baked in air at 110° C. for approximately 4 hours, whereupon it was found that the film had dried down by air oxidation to yield a varnish film which was found to be insoluble in, and with no perceptible swelling in, gasoline.

Example 7

A mixture was prepared consisting of 150 parts by weight of isoprene and 50 parts by weight of isobutylene. To this mixture there was then added 600 parts by weight of normal butane, and the mixture was cooled to −100° C. by an ethylene-containing refrigerating jacket around the mixture. A solution of aluminum chloride in methyl chloride was then added to the feed at −100° C. until approximately 5.5 parts by weight of aluminum chloride had been added to the mixture. This amount of aluminum chloride polymerized approximately ¾ of the reaction mixture. The cold polymerized mixture was then poured into warm toluene containing a small amount of alcohol (isopropyl alcohol was used, although other alcohols such as ethyl, methyl, butyl and the like could have been used) to inactivate the catalyst. A portion of the resulting solution was then treated with approximately 20% of isopropyl alcohol to precipitate the polymer. The precipitated polymer was removed from the liquid portion and dried on the roll mill. It was found to have an iodine number of approximately 161 and a molecular weight number of approximately 35,000. Another portion of the toluene solution containing approximately 40% of the polymerization resin was coated upon a series of metal panels.. These panels were baked at 100° C. for 15 hours, during which operation sufficient drying by oxidation occurred to convert the resin into a hard insoluble film which was hard enough to resist scratching by a 9-H pencil.

Example 8

A mixture was prepared consisting of approximately 175 parts by weight of butadiene with approximately 125 parts by weight of 2-methylpentene and cooled to a temperature of approximately −30° C. by a refrigerating jacket. To this mixture there was then added approximately 400 parts by weight of a solution of aluminum chloride in methyl chloride, having a concentration of approximately 0.80 grams of aluminum chloride per 100 cc's. of solution. The catalyst solution was added to the rapidly stirred and cooled olefinic mixture through a tube extending below the surface, and this amount of catalyst solution was enough to polymerize approximately ¾ or a little less of the mixed olefinic material. The unpolymerized material and catalyst solvent provided enough solvent to retain the polymer in solution in the form of a thick viscous liquid. The thick liquid was then poured into warm water to volatilize out the methyl chloride, the unpolymerized butadiene and the unpolymerized pentene. The polymer was then separated from the water in which it was insoluble and was found to be a soft, resinous material having a molecular weight of approximately 25,000 and an iodine number of approximately 125. This polymer also was readily soluble in toluene.

Portions of the toluene solution were coated on metal panels and the toluene allowed to evaporate, leaving a clear film which oxidized on standing, to an insoluble coating.

The materials obtained by this invention are capable of oxidation by atmospheric oxygen during and after the final drying of the film. This, however, is not necessary, but the drying can be aided and facilitated by substantially any of the usual paint dryers (especially if a colored lacquer is used), including such compounds as cobalt naphthenate, benzoyl peroxide and the like.

Not only is the polymer useful as a lacquer coat or paint base, but it is reactive with sulfur to produce a very valuable molding composition. The polymer is thermoplastic at elevated temperatures, and accordingly it flows readily to fill a mold, yielding clean, sharp accurate impressions. After the thermoplastic flow, to fill the mold, reaction with the included sulfur occurs to "set" the material into a non-thermoplastic, hard, tough non-brittle resin, which is highly valuable for many purposes. This resin also may be compounded with substantially any of the inert, inorganic fillers and pigments including such substances as lamp black, lithopone, barytes, rouge, lead pigments generally, chrome pigments, clays, and the various lakes and pigments in general. Similarly, any of the usual organic fillers such as the organic fibers, wood flour, ground cork and the like are also useful fillers.

The above examples suggest the use of aluminum chloride dissolved in methyl chloride as the catalyst. Other Friedel-Crafts type catalysts are similarly usable, including aluminum bromide, boron trifluoride, titanium tetrachloride, uranium tetrachloride and the like. For the solvent, various other substances, such as ethyl chloride, carbon disulfide and, in some instances, even propyl chloride may be used. The above examples suggest the use of solid carbon dioxide as the cooling material. Various other substances may also be used, including liquid propane, liquid ethane, liquid ethylene and the like. These liquid refrigerants may be used as internal refrigerants, by admixture directly with the solution of diolefin in solvent. Usually, however, they are preferably employed as external refrigerants to cool the outer surface of the reaction vessel.

Thus the invention consists in the copolymerization of predominantly diolefinic materials at low temperatures by the application to the diolefinic mixture in solution in a solvent for the resulting polymer, of a dissolved Friedel-Crafts type catalyst to produce an unsaturated polymer which when dried in the form of a thin layer, dries into a hard, clear, transparent, flexible, waterproof film.

This application is filed as a continuation-in-part of our application Serial Number 414,682, filed October 11, 1941.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. A solid polymer of a major proportion of a multi-olefin having 4 to 10, inclusive, carbon atoms per molecule with a minor proportion of a mono-olefin having from 5 to 8, inclusive, carbon atoms per molecule, said polymer being prepared at a temperature between $-10°$ C. and $-30°$ C. by the use of a Friedel Crafts active metal halide catalyst dissolved in an inert solvent which is liquid at the reaction temperature, said polymer being characterized by a molecular weight within the range of 15,000 to 25,000, an iodine number within the range between 65 and 200, low brittleness, an elongation at break less than 100%, and entire solubility in hydrocarbon solvents.

2. A solid copolymer comprising in combination a major proportion of butadiene with a minor proportion of a mono-olefin having 5 to 8 carbon atoms, inclusive, said copolymer being prepared at a temperature between $-10°$ C. and $-30°$ C. by the use of a Friedel Crafts active metal halide catalyst dissolved in an inert solvent which is liquid at the reaction temperature, said copolymer being characterized by a molecular weight within the range of 15,000 to 25,000, an iodine number within the range between 65 and 200, low brittleness, an elongation at break less than 100%, and entire solubility in hydrocarbon solvents.

3. The copolymer of claim 2 wherein the mono-olefin is diisobutylene.

4. The copolymer of claim 2 wherein the mono-olefin is isopentene.

5. The polymer of claim 1 wherein the multi-olefin is dimethyl butadiene.

6. The polymer of claim 1 wherein the multi-olefin is dimethyl butadiene and the mono-olefin is diisobutylene.

7. The polymer of claim 1 wherein the mono-olefin is isopentene.

WILLIAM J. SPARKS.
ROBERT M. THOMAS.

REFERENCES CITED

The following references are of record in the file of this patent:

UNITED STATES PATENTS

| Number | Name | Date |
| --- | --- | --- |
| 1,185,654 | Gottschalk | June 6, 1916 |
| 1,988,479 | Brooks | Jan. 22, 1935 |
| 2,023,495 | Thomas | Dec. 10, 1935 |
| 2,092,295 | van Peski | Sept. 7, 1937 |

FOREIGN PATENTS

| Number | Country | Date |
| --- | --- | --- |
| 106,371 | Australia | Jan. 26, 1939 |